(12) United States Patent
Vance

(10) Patent No.: US 8,783,622 B2
(45) Date of Patent: Jul. 22, 2014

(54) METHODS AND APPARATUS FOR A GRAPPLING DEVICE

(75) Inventor: Leonard D. Vance, Tucson, AZ (US)

(73) Assignee: Raytheon Company, Waltham, MA (US)

( * ) Notice: Subject to any disclaimer, the term of this patent is extended or adjusted under 35 U.S.C. 154(b) by 515 days.

(21) Appl. No.: 13/044,123

(22) Filed: Mar. 9, 2011

(65) Prior Publication Data

US 2012/0228435 A1    Sep. 13, 2012

(51) Int. Cl.
*B64G 1/64* (2006.01)

(52) U.S. Cl.
USPC .................... 244/172.4; 244/172.6

(58) Field of Classification Search
USPC ........... 244/172.4–172.6; 623/64; 901/10, 19, 901/24, 25, 27, 28
See application file for complete search history.

(56) References Cited

U.S. PATENT DOCUMENTS

| | | | |
|---|---|---|---|
| 7,207,525 B2* | 4/2007 | Bischof et al. | 244/172.6 |
| 2010/0139437 A1* | 6/2010 | Ichikawa et al. | 74/490.05 |

OTHER PUBLICATIONS

"Convention on International Liability for Damage Caused by Space Objects: Analysis and Background Data." From 92nd Congress, 2nd Session. May 1972. pp. 74-75.*

* cited by examiner

*Primary Examiner* — Tien Dinh
*Assistant Examiner* — Michael Kreiner
(74) *Attorney, Agent, or Firm* — Thorpe North & Western LLP

(57) ABSTRACT

A device for grappling orbital debris includes a chain of interconnected links, each having a corresponding contact sensor (for sensing contact with the orbital debris), and each connected to a subsequent link by an actuator (e.g., a worm drive assembly or the like). The actuators are configured to sequentially cause rotation of each link in the chain until the corresponding contact sensor indicates that the link has made contact with the orbital debris. Subsequently, the next link in the chain is rotated, and so on, until the chain of interconnected links substantially surrounds at least a portion of the orbital debris.

9 Claims, 2 Drawing Sheets

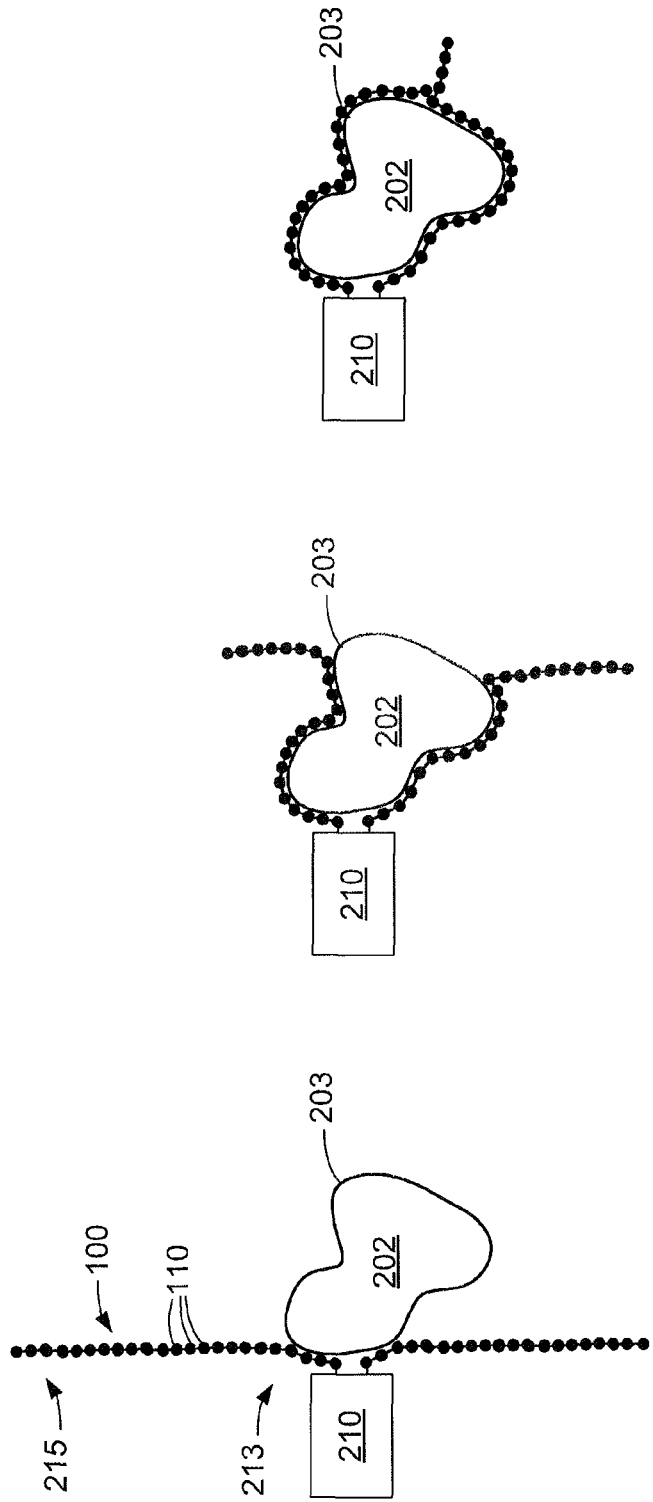

METHODS AND APPARATUS FOR A GRAPPLING DEVICE

FIELD OF THE INVENTION

The present invention generally relates to systems for grasping objects, and more particularly relates to devices for grasping (or "grappling") objects in space, such as orbital debris.

BACKGROUND OF THE INVENTION

The Earth's orbit has, over time, been increasingly cluttered with orbital debris ("space debris" or "space junk"), including broken satellite fragments, discarded rocket parts, collision products, and other objects ranging in size from small fragments to large rocket stages. This orbital debris is undesirable as it can easily damage spacecraft and/or may pose a threat if it survives re-entry through the Earth's atmosphere.

A variety of methods have been proposed for controlling, de-spinning, and de-orbiting relatively large pieces of "non-cooperative" orbital debris. Such systems include, for example, various types of nets, harpoons, electrostatic charging systems, robotic arms, and the like. Such systems are unsatisfactory in a number of respects. For example, while it is relatively easy to design a system capable of grasping (or "grappling") an object having a known size and shape, it is a much more difficult task to provide a general-purpose grappling device that is "adaptive" and capable of grappling objects that may have an arbitrary range of sizes and shapes.

Accordingly, it is desirable to provide improved systems and methods for grasping objects in space, such as orbital debris.

BRIEF SUMMARY OF THE INVENTION

In accordance with one embodiment, a device for grappling orbital debris includes a plurality of interconnected links configured to provide a corresponding plurality of contact signals and a plurality of actuators coupled between adjacent pairs of the plurality of interconnected links. The actuators are configured to cooperatively actuate, responsive to the plurality of contact signals, until the plurality of interconnected links substantially surround at least a portion of the orbital debris.

In accordance with another embodiment, a method for grappling orbital debris includes placing an open chain of interconnected links in an initial position relative to the orbital debris such that a proximal end of the open chain of interconnected links is adjacent to the orbital debris, and a distal end of the open chain of interconnected links is remote from the orbital debris. The method further includes sequentially actuating the open chain of interconnected links, starting from the proximal end and ending with the distal end, until the plurality of interconnected links substantially surrounds and contacts at least a portion of the orbital debris.

In accordance with another embodiment, a system for grapping objects in space includes a grappling device having an open chain of n interconnected links, wherein each link i from i=1 to i=n−1 is rotateably coupled to a link i+1; n contact sensors, each contact sensor i configured to indicate contact of link i with the object; and n−1 actuators, each actuator i configured to cause rotation of link i+1 with respect to link i. A controller is communicatively coupled to the contact sensors and the actuators. The controller is configured, starting at link i=1 and ending at link i=n−1, to activate actuator i+1 until contact sensor i+1 indicates that link i+1 has contacted the object.

BRIEF DESCRIPTION OF THE DRAWINGS

The present invention will hereinafter be described in conjunction with the following drawing figures, wherein like numerals denote like elements, and wherein:

FIGS. 2-4 sequentially depict the operation of a grappling device in accordance with one embodiment of the invention.

DETAILED DESCRIPTION OF THE INVENTION

Figure 1:
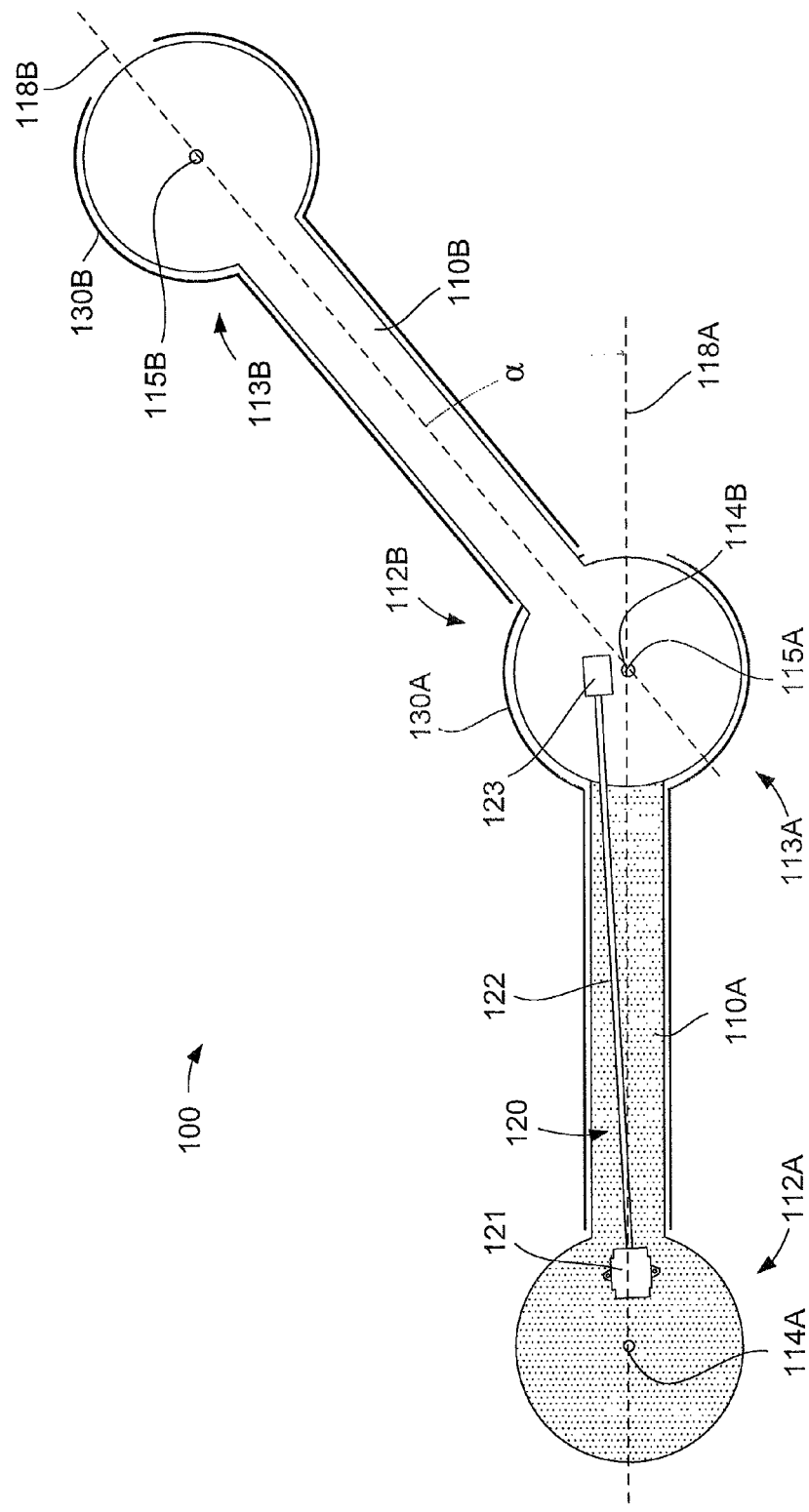
FIG. 1 is a conceptual overview of a portion of a grappling device in accordance with one embodiment.

In general, a system for grappling orbital debris includes a chain of interconnected links, each having a corresponding contact sensor (for sensing contact with the orbital debris), and each connected to a subsequent link by an actuator (e.g., a worm drive assembly or the like). The actuators are configured to sequentially cause rotation of each link in the chain until the corresponding contact sensor indicates that the link has made contact with the orbital debris. Subsequently, the next link in the chain is rotated, and so on, until the chain of interconnected links substantially surrounds at least a portion of the orbital debris. In this way, the grappling system effectively "adapts" to the shape of the target object.

For simplicity and clarity of illustration, the drawing figures depict the general structure and/or manner of construction of various embodiments. Elements in the drawings figures are not necessarily drawn to scale: the dimensions of some features may be exaggerated relative to other elements to assist understanding of the exemplary embodiments. In the interest of conciseness, conventional techniques, structures, and principles known by those skilled in the art may not be described herein, including, for example, basic control system techniques, dynamics and kinematics of machines, and/or the like.

FIG. 1 depicts a portion (i.e., two links) of a grappling device 100 in accordance with one embodiment of the present invention. As shown, a link 110A is rotateably coupled (at pivot 115A) to a link 110B. Link 110A has a proximal end 112A and a distal end 113A. Similarly, link 110B has a proximal end 112B and a distal end 113B. Thus, in this embodiment, the distal end 113A of link 110A is coupled to proximal end 112B of link 110B. Link 110B may, in turn, be rotateably coupled to a subsequent link (not shown) at pivot 115B. Likewise, link 110A may be rotateably coupled to another link (not shown) at pivot 114A. That is, links 110A and 110B are two links that compose, in part, an open chain of rotateably connected links 110, the number of which may vary, depending upon the application and relevant design factors. For simplicity and ease of reference, only two such links (an adjacent pair of links 110A and 110B) are depicted in FIG. 1.

An actuator 120 is mechanically coupled between links 110A and 110B to provide rotation of link 110B with respect to link 110A. In this way, a desired angle ($\alpha$) between the longitudinal axes (118A and 118B) of the two links can be achieved. Actuator 120 will typically be activated by an externally generated signal—e.g., a wireless or wired control signal from a microprocessor, a microcontroller, or the like that is configured to sequentially activate each of the actuators 120. In the interest of simplicity, however, neither a controller nor its interconnects are illustrated in FIG. 1.

Actuator 120 may be selected from a variety of suitable actuation devices, including, for example, various linear actuators, servos, and motors. In the illustrated embodiment, for example, actuator 120 includes a stepping motor 121 coupled to a drive shaft 122 that is accepted by a worm drive component 123. Stepping motor 121 is coupled to the proximal end 112A of link 110A, and worm drive component 123 is coupled to proximal end 112B of link 110B. Stepper motor 121 is preferably located along the longitudinal axis 118A of link 110A, and worm drive component 123 is preferably located off-center with respect to pivot 114B of link 110B. In this way, rotation of stepper motor 121 results in linear movement of worm drive component 123 with respect to drive shaft 122, which in turn causes rotation of link 110 with respect to link 110A. The available range of angles of rotation a may be determined, as is known in the art, based on the placement and geometry of actuator 120. In a particular embodiment, angle α varies from about 160 degrees to about −160 degrees.

Each link includes one or more contact sensor 130 (e.g., contact sensors 130A and 130B, as illustrated). Each contact sensor 130 provides a corresponding contact signal indicative of contact (compressive force) between contact sensor 130 and some object (e.g., the orbital debris being addressed). A variety of known sensors may be used for contact sensor 130, including basic spring-loaded switches, infrared sensors, acoustic sensors (underwater or atmospheric applications), and the like. Similarly, the placement of contact sensors 130 may vary, depending upon the shape of individual links 110.

In this regard, links 110 may have any suitable size and shape. Links 110 may, for example, have substantially the same shape and size (as illustrated), or their shapes and sizes may vary over the length of grappling device 100. In the illustrated embodiment, each of the interconnected links 110 has a generally circular proximal end 112, a generally circular distal end 113, and an inner portion extending therebetween, wherein the diameter of the ends of each link 110 is substantially larger than the width of the inner portion. In such an embodiment, it may be advantageous to provide a contact sensor 130 around all or a portion of the perimeter of distal ends 113, as illustrated, since that portion of the link 110 is most likely to make contact with the object of interest as link 110 rotates.

Links 110 may be manufactured from any combination of suitable materials known in the art. In a preferred embodiment, for example, links 110 consist of one or materials having a relatively high strength-to-weight ratio, such as aluminum, carbon-fiber, or the like. In this way, the angular momentum generated by the movement of grappling device 100 during operation can be reduced.

During operation, and as described in further detail below, actuator 120 is activated to cause rotation of link 110B with respect to link 110A until contact sensor 130B of link 110B makes contact with the object of interest (e.g., orbital debris), at which time actuator 120 is deactivated and rotation ceases. For example, if the object of interest were located to the right in FIG. 1, link 110B would generally start out at an angle α of about 90 degrees to 180 degrees (so that, for example, link 110B would not contact the object of interest prematurely due to motion of other links). Actuator 120 would then cause counter-clockwise rotation of link 110B (slowly reducing the angle α) until contact sensor 130B makes contact with the object of interest. To prevent premature contact of the subsequent links, the actuator on link 110B is simultaneously activated in the opposite direction of actuator 120, providing an orderly encircling sequence. After link 110B is in place, the subsequent link in the chain of grappling device 100 would similarly be rotated—for example, a link (not illustrated) that is coupled to link 110B at pivot 115B.

FIGS. 2-4 sequentially depict operation of a grappling device 100 as described above in conjunction with FIG. 1. Referring first to FIG. 2, a controller 210 is communicatively coupled to grappling device 100, which in this embodiment includes two open chains, segments, or "arms" of links 110. Each arm of the grappling device extends from a proximal end 213 near controller 210 to a distal end 215. Controller 210 is communicatively coupled (through suitable wired and/or wireless connections) to each contact sensor 130 and actuator 120 of links 110. Controller 210 may include any combination of hardware and/or software capable of providing the functionality described herein, as will be understood by those skilled in the art. Controller 210 will generally also include various interface components, power supplies, storage devices, microprocessors, and the like. In the interest of clarity, such well-known components are not illustrated in the figures. Likewise, the implementation of three or more deployed grappling arms 100, as opposed to the two shown, could plausibly increase the grappling capability of the device.

As shown in FIG. 2, controller 210 and grappling device 100 are brought adjacent to the object of interest (e.g., orbital debris, or simply "object") 202, which is assumed to have an arbitrary perimeter 203. Initially, it is advantageous for the ends of grappling device to be well away from object 202, preferably by orienting the chain of links generally coplanar with the leading edge of controller 210 (as shown in FIG. 2) or more preferably by "angling back" away from object 202. This initial position helps ensure that links 110 do not prematurely contact object 202 or fail to fill in concave regions of perimeter 203.

Initially, the links 110 closest to controller 210 (near proximal end 213) are actuated (i.e., rotated toward object 202) until a link makes contact with object 202 (as determined by the corresponding contact sensor 130), as depicted in FIG. 2. Rotation of links 110 then progresses sequentially from proximal end 213 toward distal end 215.

More particularly, assuming that grappling device 100 (or each arm of grappling device 100) is an open chain of n interconnected links, each link i from i=1 to i=n−1 is rotateably coupled to a link i+1. The grappling device 100 includes n contact sensors 130, each contact sensor i configured to indicate contact between link i and object 202. Grappling device 100 also includes n−1 actuators, each actuator i configured to cause rotation of link i+1 with respect to link i. Starting at link i=1 and ending at link i=n−1, Controller 210 activates actuator i until contact sensor i+1 indicates that link i+1 has contacted the object.

It will be appreciated that it may not be desirable for a given actuator to rotate all subsequent links 110 in a chain, as this lead to an undesirably high angular momentum (and, likewise, a large inertia during initial movement), and might reduce the ability of grappling device 100 to satisfactorily contact certain regions of perimeter 203. Accordingly, in one embodiment, the link 110 subsequent to the one currently being rotated is also rotated, but in the opposite direction. Stated another way, using the notation above, the controller is configured to activate actuator i+1 while activating actuator i such that the rotation of link i+2 relative to link i+1 is opposite that of link i+1 with respect to link i. The links 110 effectively "envelop" object 202, and therefore the subsequent link can be said to move in a direction opposite of this envelopment.

Thus, as seen in FIG. 3, grappling device 100 will begin to encompass, encircle, envelop, or otherwise surround and contact object 202. Ultimately, depending upon the size of object 202 and the length of grappling device 100, it may be possible to fully surround object 202 (as shown in FIG. 4). If a particular arm of grappling device 100 is longer than necessary, the excess portion may remain in any suitable configuration. Note that it is not necessary to conform exactly to perimeter 203 as shown. As long as a substantial portion of perimeter 203 has been contacted and surrounded by grappling device 100, object 202 may be adequately grappled, de-rotated, and/or moved about. In one embodiment, after the process of substantially surrounding object 202 has been completed, the actuators are simultaneously activated to tighten or "cinch up" the grasp that grappling device 100 has on object 202.

While at least one exemplary embodiment has been presented in the foregoing detailed description of the invention, it should be appreciated that a vast number of variations exist. For example, while the grappling device 100 depicted in FIGS. 1-4 is shown operating in a single plane, it may be advantageous in some contexts to employ multiple grappling device "arms" that move in multiple corresponding planes (such as three arms that operate in planes that are placed 120 degrees apart, intersecting at controller 210). Similarly, while the illustrated embodiment depicts links having a single degree of freedom (rotation) at each pivot point 114, the links may exhibit more complex, multi-axis modes of articulation—e.g., ball-and-socket joints, sliders, or the like.

Thus, it should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention, it being understood that various changes may be made in the function and arrangement of elements described in an exemplary embodiment without departing from the scope of the invention as set forth in the appended claims and their legal equivalents.

What is claimed is:

1. A device for grappling orbital debris, comprising:
   a plurality of interconnected links, each link having a contact sensor configured to provide a corresponding contact signal; and
   a plurality of actuators coupled between adjacent pairs of the plurality of interconnected links, wherein adjacent pairs of the plurality of interconnected links are caused to rotate in opposing directions;
   wherein the plurality of actuators are configured to cooperatively actuate, responsive to the contact signals produced by the plurality of interconnected links, until the plurality of interconnected links at least partially surround at least a portion of the orbital debris.

2. The device of claim 1, wherein the plurality of interconnected links includes one or more open chains of rotateably connected links.

3. The device of claim 2, wherein:
   each of the plurality of actuators includes a first drive assembly coupled between a first link of the plurality of interconnected links and a second link of the plurality of interconnected links;
   wherein the first drive assembly is configured to rotate the second link a selected angle with respect to the first link.

4. The device of claim 3, wherein:
   a third link of the plurality of interconnected links is coupled to the second link; and
   a second drive assembly is coupled between the second link and the third link;
   wherein the plurality of actuators are configured to cooperatively actuate such that, when the second link rotates the selected angle with respect to the first link, the third link rotates in a direction opposite that of the envelopment resulting from the selected angle.

5. The device of claim 4, wherein the first drive assembly is configured to rotate the second link with respect to the first link until a first contact signal associated with a contact sensor of the second link is produced.

6. The device of claim 5, wherein the second drive assembly is configured to initiate rotation of the third link with respect to the second link after the contact signal is produced.

7. The device of claim 3, wherein the drive assembly includes a motor component fixed to the first link, a drive shaft coupled to the motor component, and a worm drive component configured to accept the drive shaft and coupled to the second link.

8. The device of claim 1, wherein the plurality of actuators are further configured to simultaneously tighten the plurality of interconnected links around the orbital debris after substantially surrounding at least a portion of the orbital debris.

9. The device of claim 1, wherein each of the interconnected links has a generally circular proximal end, a generally circular distal end, and an inner portion extending therebetween, wherein the diameter of the distal and proximal ends of each link is substantially larger than the width of the inner portion.

* * * * *